United States Patent [19]
Yencho

[11] Patent Number: 5,344,602
[45] Date of Patent: Sep. 6, 1994

[54] CONTINUOUS FORMING OF FIBER COMPOSITE MATERIALS

[75] Inventor: Stephen A. Yencho, Stanford, Calif.

[73] Assignee: The Board of Trustees of the Leland Stanford Junior University, Stanford, Calif.

[21] Appl. No.: 930,730

[22] Filed: Aug. 14, 1992

[51] Int. Cl.$^5$ ............................................. B29C 53/04
[52] U.S. Cl. ................... 264/258; 264/101; 264/313; 264/339; 264/510; 156/222
[58] Field of Search ............... 264/339, 285, 295, 510, 264/101, 102, 313, 316; 425/363, 367; 156/221, 222

[56] References Cited

U.S. PATENT DOCUMENTS

| | | |
|---|---|---|
| 2,676,360 | 4/1954 | Emmer . |
| 2,932,065 | 4/1960 | Jenkins . |
| 3,278,355 | 10/1966 | Borup . |
| 3,740,207 | 6/1973 | Bogrets et al. . |
| 3,992,505 | 11/1976 | Tally . |
| 4,160,006 | 7/1979 | Patzner et al. ........................ 264/339 |
| 4,296,060 | 10/1981 | Killmeyer et al. . |
| 4,336,222 | 6/1982 | Prohn . |
| 4,545,947 | 10/1985 | Bozoarth et al. . |
| 4,631,017 | 12/1986 | Hayashi . |
| 4,744,846 | 5/1988 | Pflug et al. ........................... 156/222 |
| 4,746,386 | 5/1988 | Sato et al. . |
| 4,747,768 | 5/1988 | Crupi . |
| 4,759,815 | 7/1988 | Frey ..................................... 156/222 |
| 4,777,005 | 10/1988 | Miller . |
| 4,955,803 | 9/1990 | Miller et al. . |

FOREIGN PATENT DOCUMENTS

| | | |
|---|---|---|
| 2362465 | 6/1975 | Fed. Rep. of Germany . |
| 56-104023 | 8/1981 | Japan .................................... 156/222 |
| 59-39523 | 3/1984 | Japan . |

OTHER PUBLICATIONS

J. B. Cattanach et al., "APC: Peek/Carbon Fibre Composite Application Note: Roll Forming", Imperial Chemical Industries, Jun. 1984.
G. R. Griffiths et al., "Manufacturing Techniques for Thermoplastic Matrix Composites," SAMPE Journal, p. 32-35 (Sep./Oct. 1984).

Primary Examiner—Catherine Timm
Attorney, Agent, or Firm—Gregory Garmong

[57] ABSTRACT

A workpiece of a fiber-containing composite material is formed in a kinematically admissible manner by applying a tension loading to the workpiece in a transverse direction and passing the workpiece in the transverse direction through apparatus having a bending roller extending in the longitudinal direction over substantially the entire length of the workpiece. The workpiece is formed over the bending roller by introducing a net bending deformation into the workpiece and progressively propagating the bend transversely through the workpiece as the workpiece is moved in the transverse direction. The transverse laminar length of the workpiece remains substantially unchanged during the forming process. Preferably, the workpiece is contained within a vacuum bag during the forming operation.

14 Claims, 7 Drawing Sheets

CONTINUOUS FORMING OF FIBER COMPOSITE MATERIALS

This invention was made with Government support awarded by the National Science Foundation under Contract Number 2DHZ434. The Government has certain rights in this invention.

BACKGROUND OF THE INVENTION

This invention relates to an apparatus and a process for deforming materials, and, more particularly, to an apparatus and a process for continuously and progressively forming composite material workpieces.

A composite material combines two or more other materials into a single integrated material structure, in a manner whereby the combined materials retain their original identities. One of the best known, commercially most important types of composites is the fiber composite material formed of long, substantially continuous high-strength fibers incorporated into a metallic or a polymeric matrix. These composites typically have large numbers of fibers embedded in the matrix. The fibers are usually selected to be strong, but are of low elongation to failure. Examples of the materials used as high-strength fibers include carbon, graphite, glass, "KEVLAR", aramid boron and silicon carbide.

The matrix holds the fibers in the proper orientation and protects them from external damage. The matrix may be a metal or nonmetal, such as a polymer. Polymeric mattix materials fall into two general classes, thermosetting and thermoplastic. Most thermosetting polymers are not readily formable after curing by deformation processes. However, thermoplastic polymers can be plastically deformed, at sufficiently high temperatures, to a permanent change in shape without fracture because they do not require curing.

The present invention relates to fiber composite materials having long fibers embedded in a plastically deformable matrix. Examples of such types of composites include metal and polymer matrix composites having long fibers. At the present time one of the most important types of such composites is prepared with carbon or glass fibers embedded in a matrix having a high temperature operating capability, such as polyetheretherketone (PEEK). The development of such fiber composite materials is continuing, with new combinations having improved properties emerging each year.

The most commonly used approach to making articles of the composite material is to lay up tapes of fiber-containing matrix material into dies, and then to consolidate the tapes by pressing the tapes with another die in a large heated press. Consolidation can also be accomplished with a single die in an autoclave. To achieve good strength and stiffness properties in the finished material, the fibers in the layers may be oriented in various directions within the plane of the workpiece. The consolidated laminate therefore consists of discrete layers or plies. Within each ply there is an intimate mixture of fiber and matrix material, but between layers there is often some additional matrix material.

The press used to consolidate the tapes can utilize flat platen dies to press the layers of composite material, to produce a flat plate of the composite material. Flat plates have limited uses, because most components are not flat, and instead contain curved sections. Shaped pieces of composite can be made by substituting curved fixed dies for the flat platens, so that the composite is consolidated to the desired final shape. Alternatively, pieces of the composite can be consolidated as flat plates, and then reshaped using fixed dies corresponding to the overall final shape of the component, in a separate die forming operation. This approach is termed post forming.

The fabrication of composite structures using fixed dies has significant drawbacks and limitations, both from technical and economic standpoints. Forming in a press having dies for platens often results in gaps and voids in the structure, particularly between layers, because of the difficulties in achieving the proper uniform layup of the tapes prior to pressing and a uniform pressing pressure during die forming. The post-forming approach may produce high compressive stresses in the fibers in the concave-going side of bends, resulting in buckling and misalignment of the fibers and unsatisfactory mechanical properties. Economic drawbacks to the use of the die-forming approach are equally significant.

In a recently developed alternative approach, a fiber composite workpiece is progressively formed into a shaped piece in a die-less forming operation. The workpiece is formed by passing it through a forming apparatus in which a bend or curve is introduced into the workpiece, and that bend is propagated throughout the workpiece. This approach has the important advantage of achieving the formed shape by a kinematically admissible technique wherein the lengths of the composite laminae remain constant during the forming operation, thereby avoiding the laminar buckling and fiber breakage problems that occur during press forming. The die-less forming technique is disclosed in U.S. Pat. Nos. 4,777,005 and 4,955,803, whose disclosures are incorporated by reference.

Although the die-less forming technique provides a major advance over the die-forming techniques and is successfully employed in many situations, it may have technical and economic limitations in others. There may be limitations on the fabrication of particular shapes and bends. In some cases, there are limits on the speed of the forming operation, affecting the process economics.

Thus, there remains a need for an improved forming operation that produces high-quality, defect-free articles and parts, in an economically efficient manner. The present invention fulfills this need, and further provides related advantages.

SUMMARY OF THE INVENTION

The present invention provides an improved die-less forming technique. The approach of the invention produces articles of improved quality as compared with both die-forming techniques and prior die-less forming techniques. Additionally, it is faster and requires less expensive fabrication equipment, which contributes to improved process economics.

In accordance with the invention, a forming process includes supplying a workpiece of a reinforced composite material having reinforcements embedded within a matrix, and applying a tension loading to the workpiece in a loading direction. The process further includes bending the workpiece about an axis lying perpendicular to the loading direction in a kinematically admissible manner such that the laminar length of the workpiece, in the direction of loading, remains substantially unchanged during the bending process.

More specifically, a process for continuously forming a transverse bend in a workpiece of a fiber-containing composite material comprises the steps of supplying a workpiece of a fiber-containing composite material having fibers embedded within a matrix, the workpiece having a longitudinal direction and a transverse direction defined therefor, applying a tension loading to the workpiece in the transverse direction, and passing the workpiece in the transverse direction through apparatus having a bending roller extending in the longitudinal direction over substantially an entire length of the workpiece. The bending roller permanently bends the composite workpiece by introducing a net bending deformation into the workpiece, and progressively propagating the introduced net bending deformation transversely through the workpiece as the workpiece is moved in the transverse direction. The propagation of the net bending deformation is accomplished such that the transverse laminar length of the workpiece remains substantially unchanged during the forming process.

Unlike die-forming operations, the process and apparatus form a composite material workpiece by progressive, kinematically admissible deformation processes. But unlike prior dieless-forming operations, the deformation is propagated using a single bending roller. The workpiece, and specifically the entire forming zone, is placed under tension by applying a tension loading to the workpiece. This is to be contrasted with prior dieless-forming techniques wherein portions of the forming zone are under tension applied by rollers in the forming zone, while other portions of the forming zone are under compression applied by other rollers in the forming zone.

The apparatus may take any of several operable forms. In the preferred approaches, the leading edge of the workpiece is grasped in a drawing frame that is inclined to the forming roll at either a fixed or a controllable angle, so that the bend introduced at the leading edge is progressively drawn over the bending roller. The grasping mechanism can include a second roller or fixed cylinder on the opposite side of the workpiece from the bending roller, so that an S-shaped bend is initially Introduced into the workpiece. All or a portion of the S-shaped bend is thereafter propagated through the workpiece to its final position by drawing the grasping mechanism, and thence the workpiece, away from the bending roller so that the workpiece bends over and against the bending roller.

For most composite materials, It is necessary to heat the workpiece locally in the forming zone to above the plastic flow temperature of the matrix of the composite material as it passes over the bending roller. The workpiece is cooled at other locations, as necessary, so that its temperature is below the plastic flow temperature of the matrix. The deformation introduced by the bending roller is thereby "frozen" into the workpiece. Any operable heating and cooling techniques are acceptable. In the preferred approach, the bending roller itself supplies the heating to the composite material, to ensure that heating occurs only in the forming zone. Three approaches have been utilized and are preferred. In the first, the bending roller is made of infrared-transparent quartz and an infrared heating element is placed inside the bending roller. In the second, the bending roller is made of an electrically nonconducting material and an induction coil heater is placed inside the bending roller. In the third, the bending roller is thermally conductive and is heated internally by an infrared heater. In these cases, the composite material is necessarily heated only in the forming zone. To cool the composite material workpiece, the bending roller may be structured as a cooling gas manifold with radial holes to permit the escape of cooling gas to those locations not contacted by the bending roller. Auxiliary heating and cooling sources can be used as necessary to preheat the workpiece before it reaches the forming zone or postcool the workpiece after it leaves the forming zone, respectively. With any of these heating techniques, a tensioned membrane or vacuum bag on either side of the workpiece may be used to provide a normal surface force to suppress delamination.

In initial testing of the approach of the invention, it was observed that in some cases there was minor surface delamination of the composite material workpiece, especially near the longitudinal edges, after forming. A dynamic vacuum forming bag was devised to contain the workpiece. The workpiece is enclosed within the vacuum forming bag, which passes through the forming operation with the workpiece. The atmospheric pressure applied perpendicular to the surface of the workpiece during forming reduces the incidence of the surface delamination. The vacuum forming bag is made of a deformable material that encloses the workpiece, and may be provided with deformable side strips that act as matrix-flow stops, thereby aiding in maintaining the shape of the workpiece as it passes through the forming zone. Baking the workpiece prior to deformation may also reduce the incidence of delamination during processing, by driving out moisture from the workpiece that may later lead to delamination.

The present approach provides an important advance in the art of forming composite material workpieces. Workpieces are formed in an economical single forming pass using a relatively compact apparatus. The formed composite material workpieces are of high quality. Other features and advantages of the invention will be apparent from the following more detailed description of the preferred embodiments, taken in conjunction with the accompanying drawings, which illustrate, by way of example, the principles of the invention.

BRIEF DESCRIPTION OF THE DRAWINGS

FIG. 2 is a series of schematic side elevational views of.

FIG. 7 is a schematic side view of a detail of the apparatus of FIG. 9, showing the sequence of the introduction and propagation of the bend, wherein

FIG. 8 is a schematic perspective view of a variation of the apparatus of FIG. 9 used to introduce tapered bends into the workpiece, wherein

DETAILED DESCRIPTION OF THE INVENTION

The present invention deals with the forming of composite material having relatively nondeformable fibers embedded in a deformable plastic or metal matrix. Such matrix materials often do not flow plastically at ambient temperatures but flow more readily at elevated temperatures. Such fiber-containing composite materials are difficult to form into components having curved or bent portions because it is difficult to avoid fracturing or misaligning the fibers during the forming process.

Figure 1:
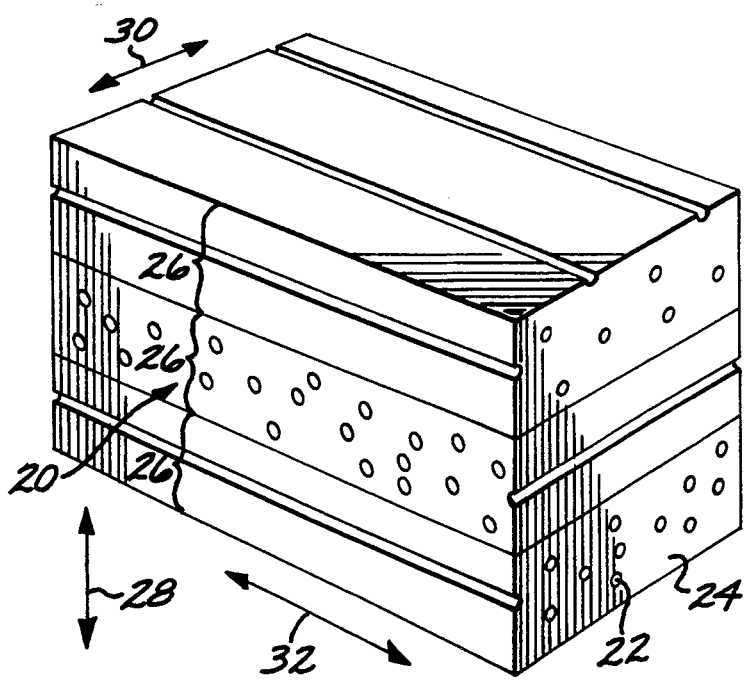
FIG. 1 is a schematic perspective view of a fiber-containing composite material having multiple layers.

FIG. 1 Illustrates a fiber-containing composite material 20 having fibers 22 lying in a matrix 24. The composite material 20 is illustrated as having three layers 26 or plies, with all of the fibers 22 lying in the plane of the layers. In most applications there will be many layers or plies with different fiber orientations in various layers. Within each layer 26, the fibers 22 lie generally parallel to each other. In many applications, composite materials are utilized as a workpiece having one relatively thin dimension and the workpiece must be curved or bent in the through-thickness direction 28, either with a longitudinal or a transverse bend.

There are several cases for bending of the workpiece. In one case of interest here, the workpiece is singly curved and long in the straight direction. During these bending operations, a longitudinal direction 30 remains straight and a transverse direction 32 is bent into a curved profile.

In a typical forming situation, the composite material 20 must be bent to form a curved panel. One of the most demanding bending operations, which is frequently encountered in practice, requires that the composite be bent with some fibers lying totally or partially in the workpiece direction which is to become a curve. FIG. 2 depicts such a bending operation. To illustrate the problem arising during this bending process, the composite 20 has been divided into a series of laminae 34, which may, but need not, correspond to the layers 26 of the composite material 20. In elevational view, the laminae 34 lie parallel to the fibers 22 and the transverse direction 32 for transverse bending, at increasing spacings from an inner surface 36 of the composite material 20. The end-to-end length of the composite material 20 within a selected lamina 34 is termed the laminar length. As illustrated for a flat plate of composite material 20 in FIG. 2(a) an inner laminar length 38 of the lamina 34 lying adjacent the inner surface 36 is the same as an outer laminar length 40 of the lamina lying furthest from the inner surface 36.

Figure 2A:
FIG. 2(a) a flat composite plate, FIG. 2(b) a composite plate bent into a curve by conventional die forming, illustrating the varying laminar lengths through the section, FIG. 2(c) the plate of FIG. 2(b) showing the effect on the fibers, and FIG. 2 (d) a composite plate bent into a curve by the present progressive forming approach, with substantially constant laminar lengths through the section.
Figure 2B:
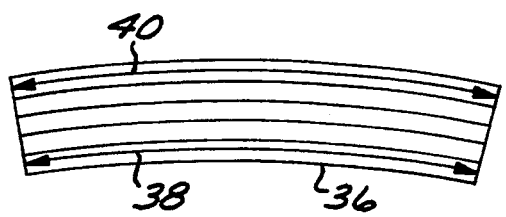
Figure 2C:
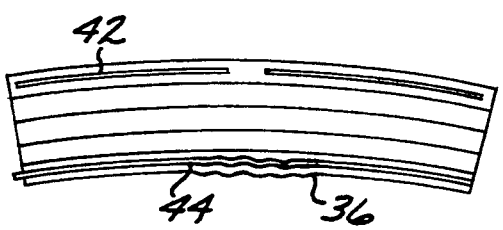

When a plate of composite material is bent as illustrated in FIG. 2(b), as experienced in fixed-die forming, a neutral axis of the plate remains unchanged in length, while there is a natural tendency for the inner laminar length 38 to decrease and the outer laminar length 40 to increase. If the piece being bent is a conventional ductile metal not having continuous fibers, the lengthening of the outer laminate and the shortening of the inner laminate do not pose a significant problem, since the ductile metal deforms to accommodate these length changes. Because the composite material 20 contains relatively inextensible fibers 22 lying parallel to the laminar lengths, such ductile deformation of the entire composite material 20 cannot occur. Instead, during bending the fibers lying furthest from the inner surface 36 are placed into tension, while the fibers lying nearest to the inner surface 36 are placed into compression. In a severe bending operation, the tensile stresses may be sufficiently high to fracture the fibers 42 lying furthest from the inner surface 36, and the compressive stresses may be sufficiently high to buckle the long, thin fibers 44 lying near to the inner surface 36, so that these fibers become misaligned and the inner surface 36 becomes wrinkled, as illustrated in FIG. 2(c). A conventional forming operation using fixed dies causes such loadings in the fibers, because of the surface constraints placed onto the composite material 20 by the dies.

Figure 2D:

A more desirable situation is illustrated in FIG. 2(d), wherein the laminae are allowed to shear past each other during the bending operation, so that the inner laminar length 88 and the outer laminar length 40 remain constant and equal to their length in the flat plate illustrated in FIG. 2(a). The types of problems illustrated in FIG. 2(c) are thereby avoided. The kinematically admissible forming technique disclosed in U.S. Pat. No. 4,955,809 describes one approach for accomplishing such a forming operation, and the present technique is another.

Figure 3:
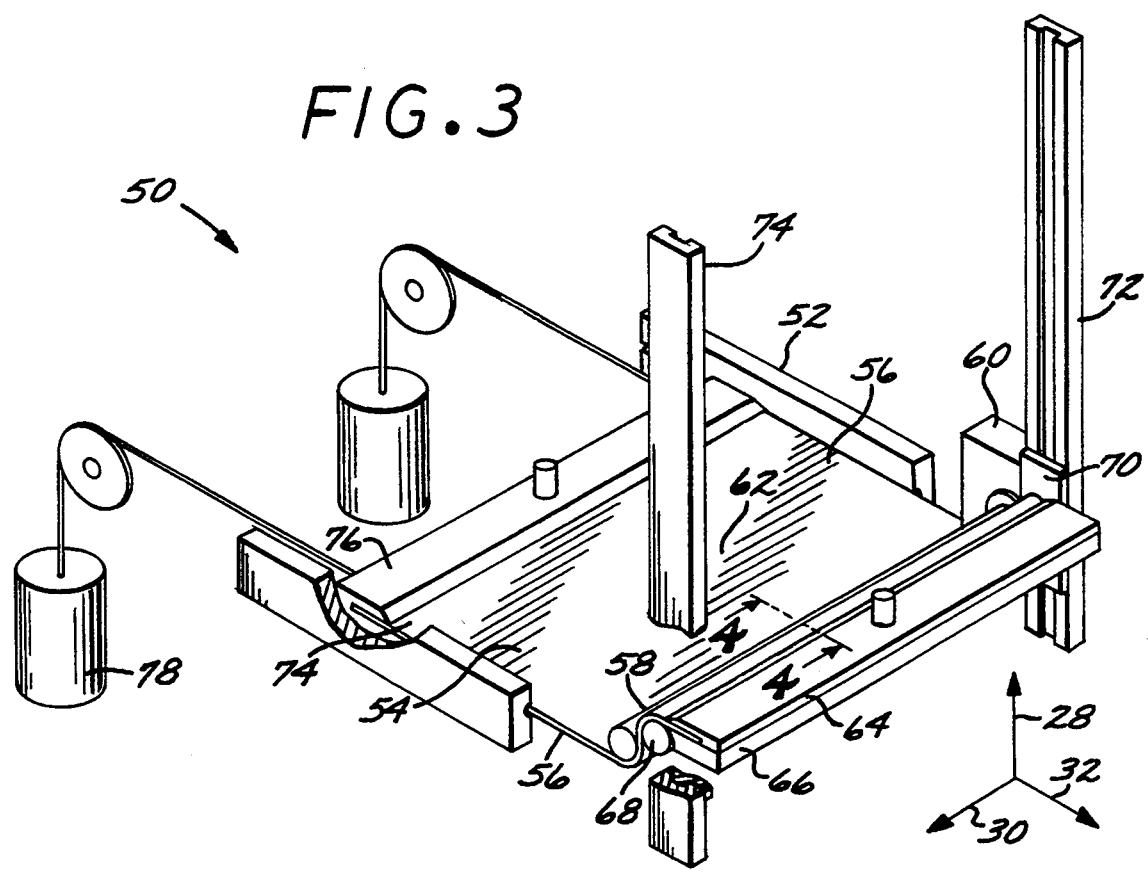
FIG. 3 is a schematic perspective view of a basic apparatus according to the invention.
Figure 4:
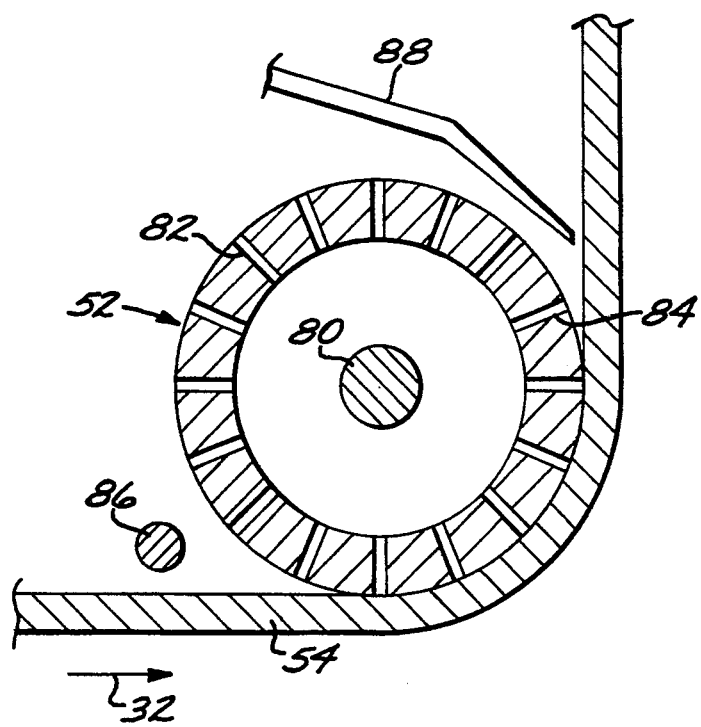
FIG. 4 is an enlarged sectional view of the bending roller of FIG. 9, taken along lines 4—4.

An apparatus 50 according to the present approach is illustrated in FIG. 3. The apparatus 50 includes a frame 52 that slidably supports a composite material workpiece 54 by its longitudinal edges 56. At one end of the frame 52 is a bending roller 58 mounted at each end from a bearing and bearing support 60. The bending roller 58 is mounted with its axis of rotation parallel to the longitudinal direction 30. As shown in FIG. 4, the bending roller 58 is mounted from the support 60 to be tangential to a top side 62 of the workpiece 54 (or vacuum envelope or tensioned membrane, as will be described subsequently). The bending roller 58 extends the entire length of a transverse edge 64 of the workpiece 54. The bending roller 58 is normally operated in a freewheeling mode, but the bearing support 60 may also contain a drive motor so that the bending roller 58 may be driven in either rotational direction.

The entire length of the leading transverse edge 64 of the workpiece 54 (or vacuum envelope containing the workpiece) is grasped so that the workpiece 54 can be drawn past the bending roller 58. The preferred grasping means includes a clamp 66 and a second roller 68 mounted Just below and toward the proximate edge of the clamp 65. The clamp 66 and the second roller 68 extend the entire length of the leading transverse edge 64. The ends of the clamp 66 and the second roller 68 are supported in a block 70 that is slidably mounted to a slide 72. The second roller 68 may be mounted in a bearing and bearing support in the block 70, but is not necessarily so mounted.

At the other end of the workpiece 54, a trailing transverse edge 74 is grasped in a similar clamp 76, but no comparable roller is used at the trailing edge 74. A force 78, illustrated to be a constant dead-weight force, is applied to the clamp 76 so that there is a tension loading on the workpiece 54 in the transverse direction 32.

FIG. 4 shows the structure of the bending roller 58 in greater derail. The bending roller 58 is hollow and preferably has a heating element 80 located therein. The heating element heats the composite workpiece 54 locally in the region adjacent the bending roller 58, termed the forming zone. The heating element 80 is preferably an infrared heater. For this preferred case, the bending roller 58 is made of a high-modulus material. The infrared heater heats the surface 62 of the workpiece 54 directly with energy conducted or radiated through the bending roller 58, where the bending roller 58 is made of an infrared-transparent material such as quartz, and/or by conduction through the bending roller 58. Alternatively where the fibers in the composite material are electrically conducting, the heating element 80 may be an elongated induction coil such as a double-D coil. In this case, the bending roller 58 can be made of any electrically nonconducting material such as a ceramic. The heating element 80 could also be a resistance heater or any other type of heating unit, but in those cases the roller itself would be heated, requiring cooling of the bearings and other components.

The workpiece 54 is drawn past the bending roller 58 by the grasping mechanism in the transverse direction. Prior to any selected region of the workpiece 54 reaching the bending roller 58, that region is at a temperature below the forming temperature. Such region of the workpiece 54 is heated by the heating element 80 as it passes over the bending roller 58 to a forming temperature at which the matrix of the composite material workpiece 54 deforms plastically.

After the heated region of the workpiece 54 leaves contact with the bending roller 58, it must be cooled so that the matrix is again at a temperature below its plastic deformation temperature, thereby preventing it from deforming further plastically and giving the composite material the strength to retain its shape. Sufficient cooling is ordinarily provided by a gas jet 88, in combination with a solid bending roller 58. In other cases such as the formation of variable-radius bends in the manner to be discussed subsequently, the bending roller 58 is provided with a plurality of cooling openings 82 therethrough. The interior of the bending roller 58 is pressurized with a gas such as nitrogen or air to act as a gas plenum, and the pressurized gas escapes through the cooling openings 82. The flow of cooling gas through the openings 84 that are at any moment directed toward the workpiece 54 as it leaves the bending roller 58 cool the workpiece 54 as required. The flow of cooling gas through the other openings cools the bending roller 58 to maintain it at an operating temperature. Cooling gas cannot pass through those cooling openings that are contacting the workpiece 54. In other cases, natural convection cooling of the workpiece 54 may be sufficient to cool it to below the forming temperature at a sufficient rate.

If necessary, additional preheating can be supplied by a preheating element 86.

The second roller 68 is similar in construction to the bending roller 58. The second roller 68 is hollow with an internal heating element, and may have similar cooling openings, in the manner described.

Preliminary studies with the apparatus 50 showed that it successfully formed composite material workpieces. However, in some instances there were delaminations on the surfaces of the formed workpieces, and local thinning at the longitudinal ends of the workpiece due to matrix flow out the sides of the workpiece while it was heated in the forming zone. To avoid such irregularities and to further aid In defining the shape of the formed workpiece precisely, a dynamically deforming vacuum bag 90 was devised.

Figure 5:
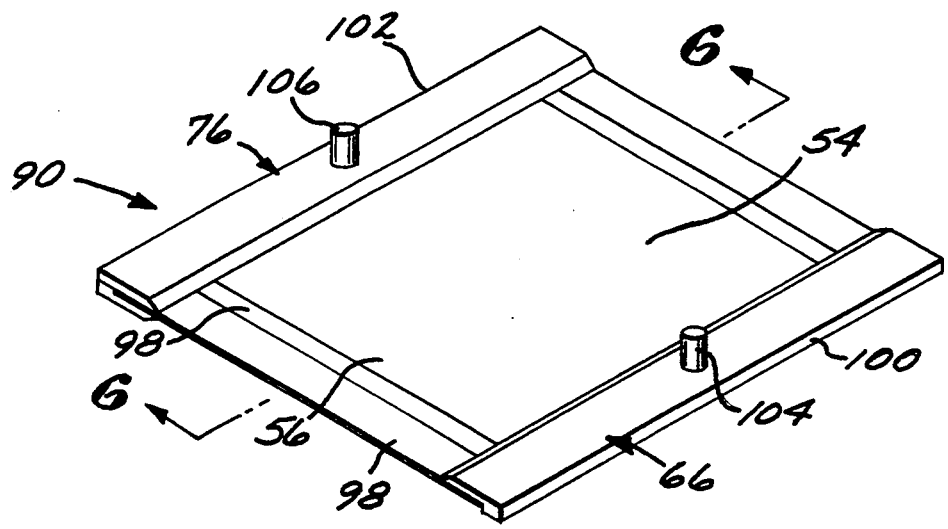
FIG. 5 is a perspective view of a dynamic forming vacuum bag.
Figure 6:
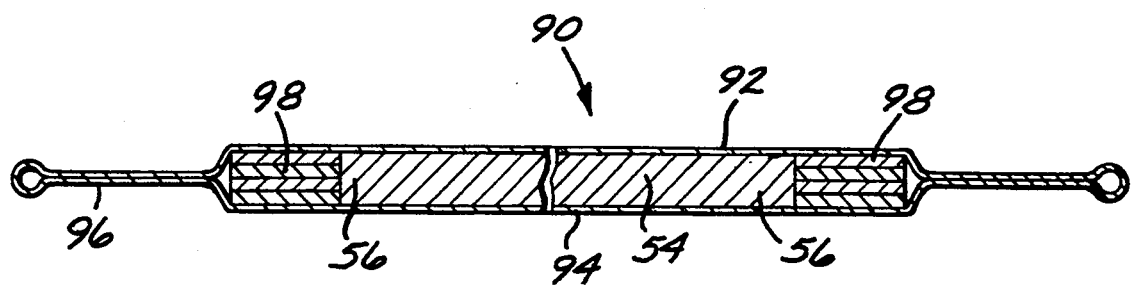
FIG. 6 is a sectional view of the vacuum bag of FIG. 5 taken along lines 6—6.

FIGS. 5 and 6 illustrate the vacuum bag 90 used in conjunction with the other components of the apparatus 50. The workpiece 54 fits within the vacuum bag 90. The walls of the vacuum bag 90 comprise a top layer 92 and a bottom layer 94 of a flexible material that will withstand the temperature to which the workpiece is heated in the forming zone, preferably a high temperature plastic such as a polyimide. A breather layer between the top layer 92 and the bottom layer 94 may be provided to vent outgassing from the workpiece. The top layer 92 and the bottom layer 94 are joined on their edges. The vacuum bag 90 is made oversize so that the workpiece 54 may easily slip into the vacuum bag 90. When a vacuum is later applied to the interior of the vacuum bag 90, atmospheric pressure presses the excess material together along the edges of the workpiece 54, as called out by numeral 96.

A set of side strips 98 may be placed inside the vacuum bag 90 adjacent each of the longitudinal edges 56 of the workpiece 54, if the quality of the edges 56 is important. (If, on the other hand, the quality of the edge regions is not important because they are to be removed, for example, the side strips are not necessary.) When a vacuum is applied to the interior of the vacuum bag 90, the side strips 98 are forced against the sides of the workpiece 54 by the external air pressure acting through the material of the vacuum bag. The side strips 98 have at least three beneficial effects. First, they define the thickness of the workpiece 54, so that it cannot locally thin, particularly at the longitudinal ends 56. Second, they define the length in the longitudinal direction 30 of the workpiece 54, so that the workpiece cannot become longer due to the matrix flow during forming. Third, they provide an anchoring point for the top layer 92 and bottom layer 94 of the vacuum bag material.

The side strips 98 are preferably made by stacking a number of thin strips of aluminum or an aluminum alloy, "TEFLON", polytetrafluoroethylene ultra high molecular weight polyethylene, or polyetherimide. Most preferably, the side strips are 1100-0 temper aluminum, which is a nearly pure aluminum material. Each strip is about 0.010 to 0.020 inch thick, and as many individual strips as necessary to match the thickness of the workpiece 54 are stacked to form the side strips 98. The side strips 98 move through the forming apparatus 50 as part of the dynamic forming vacuum bag 90.

The clamps 66 and 76 are formed as partially hollow caul plates 100 and 102, respectively, when the vacuum bag 90 is used. The top layer 92 and bottom layer 94 of the vacuum bag material are fixed to the sides of the caul plates 100 and 102. Each caul plate 100 and 102 has a vacuum manifold, 104 and 106, respectively. A vacuum is drawn on the manifolds 104 and 106, which is transmitted through the hollow interior of the caul plates 100 and 102 to the interior of the vacuum bag 90. The vacuum may be a static vacuum, in which case the manifolds 104 and 106 are sealed before forming begins, or it may be a dynamic vacuum, in which case the manifolds are pumped during forming.

The structure of the vacuum bag 90 is to be distinguished from that of conventional vacuum bags used in consolidation of composite material parts in many applications. Conventional vacuum bags do not deform, except in a minor way as the thickness of the composite part is reduced during consolidation. The present vacuum bag 90 is deformed to the same degree as the workpiece 54 is bent. Conventional vacuum bags also do not use side strips 98.

FIG. 7 schematically illustrates the use of the apparatus 50 to form a composite material workpiece 54. FIG. 7(a) depicts the initial state, with the bending roller 58 contacting the top side 62 of the workpiece 54, the leading transverse edge 64 of the workpiece 54 grasped by the clamp 66, and the second roller 68 positioned below the workpiece 54. The heating elements and cooling gas flows in the rollers 58 and 68 are turned on (where such gas flows are provided), and the forming zone of the workpiece is heated to the appropriate forming temperature. In the next step, shown sequentially in FIGS. 7(b) and 7(c), the clamp 66 and second roller 68 are moved upwardly in the slide 72 (not shown), creating an S-shaped curvature in the workpiece 54. The deformation is introduced from the leading transverse edge 64 of the workpiece 54 or in some other fashion to ensure no net bending of the workpiece, ensuring that the deformation will be of a kinematically admissible type.

Figure 7A:
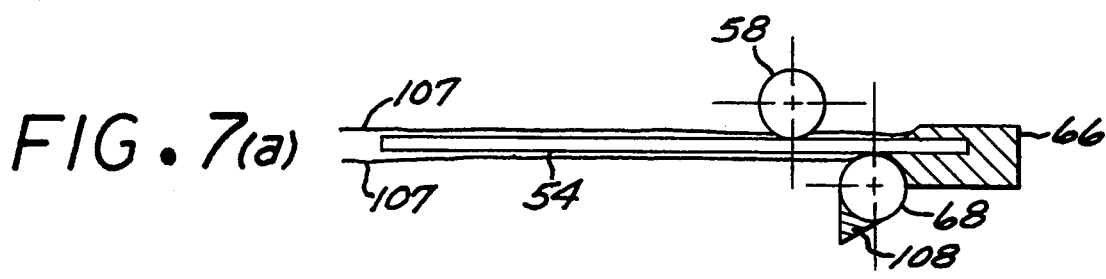
FIG. 7(a) shows the initial state.
Figure 7B:
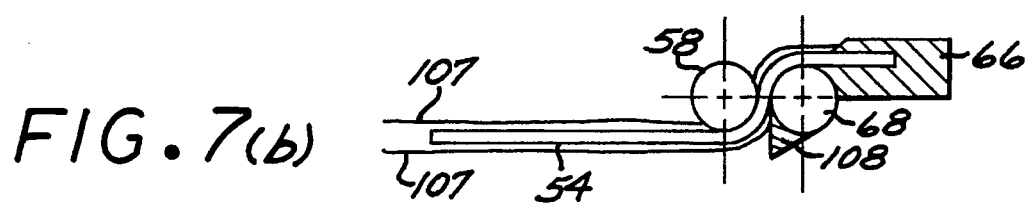
FIG. 7(b) shows the Introduction of an S-shaped bend into the leading transverse edge of the workpiece.
Figure 7C:
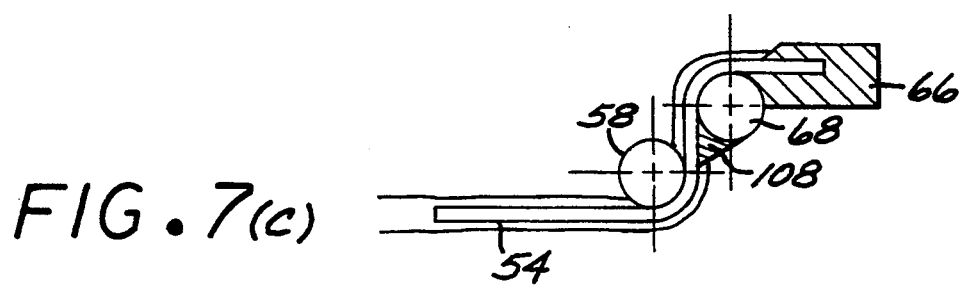
FIG. 7(c) illustrates the beginning of the propagation of the S-shaped bend.
Figure 7D:
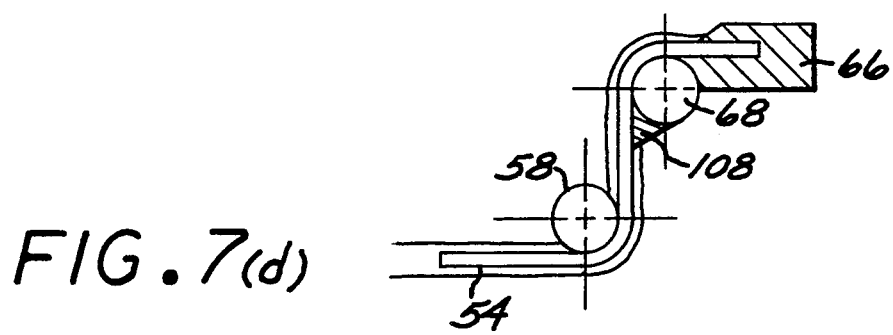
FIG. 7(d) illustrates a later stage in the propagation of the S-shaped bend through the workpiece.

When the vacuum bag 90 is used, the end blocks 70 are preferably provided with tabs 108 that ride against the region of the bottom layer 94 overlying the side strips 98. The tabs 108 thereby prevent excessive plastic deflection of the side strips 98, and thence the composite material workpiece 54, due to overbending. Continuing the forming operation, as shown in FIG. 7(d) one of the bends of the S-shaped curvature is propagated through the workpiece 54 by continuing to move the block 70 upwardly. By this approach, bends can be propagated throughout the workpiece 54 in any desired manner.

In some instances, the protection of a vacuum environment is not required, but it is still desirable to constrain and protect the surfaces of the workpiece 54 during deformation. FIG. 7 illustrates the use of a tensioned membrane 107 placed between the faces of the workpiece 54 and the rollers 58 and 68. The membrane, made of a high temperature, flexible material such as a polyimide, provides a further surface constraint against the formation of delaminations and also reduces the friction between the surfaces of the rollers 58 and 68, and the contacting surfaces of the workpiece 54.

Figure 8A:
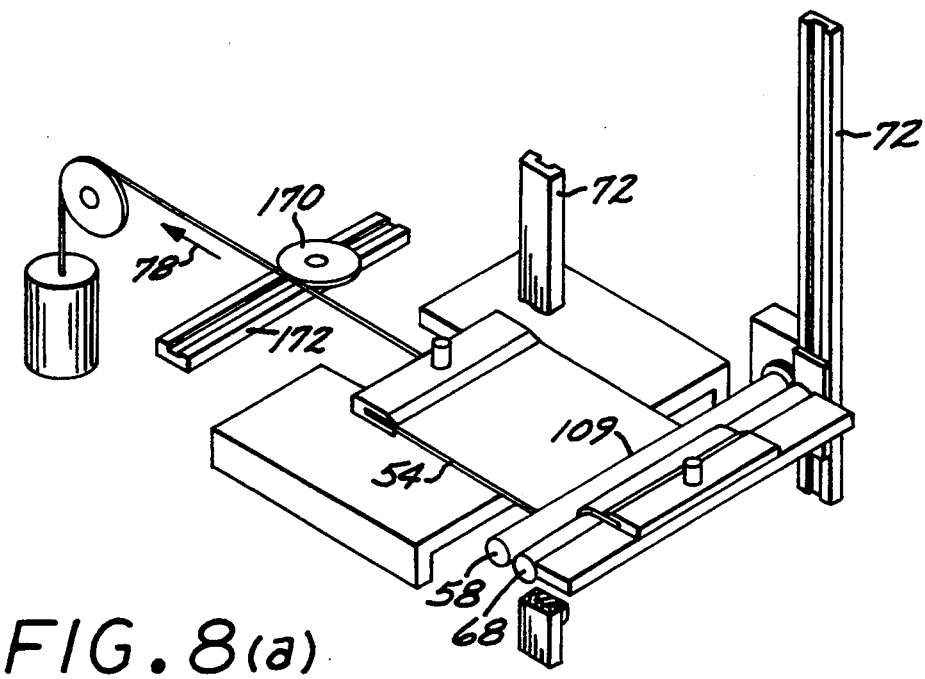
FIG. 8(a) shows the apparatus at the end of the initiation phase.
Figure 8B:
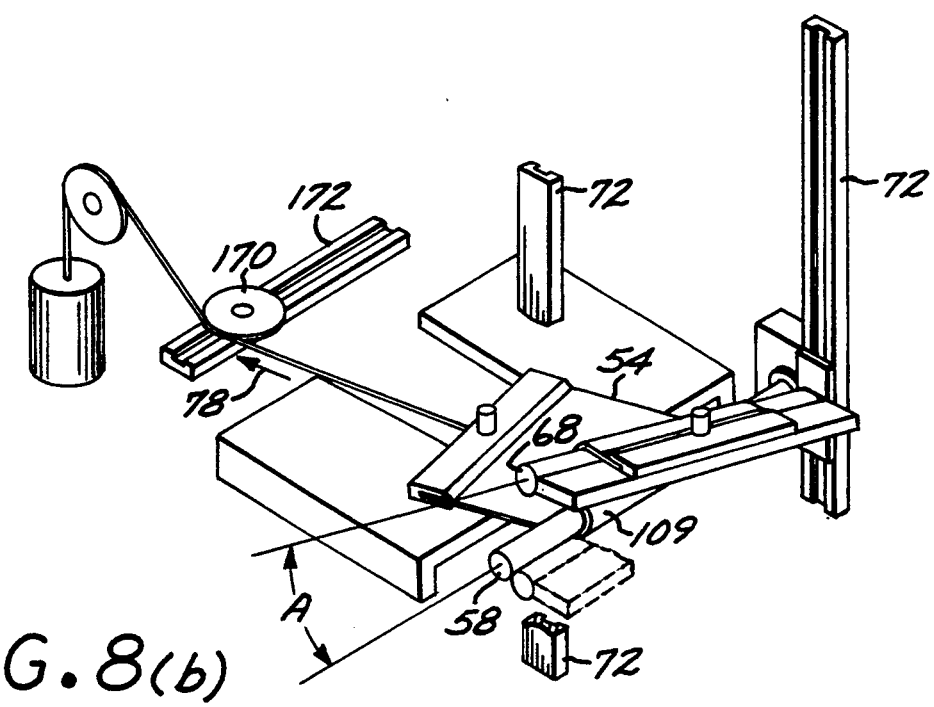
FIG. 8(b) shows the apparatus during the propagation phase.

In a variation of the general forming apparatus illustrated in FIG. 3, tapered bends may be introduced into the workpiece, as shown schematically in FIG. 8. This apparatus is similar to that previously described, except as follows. To introduce a tapered bend into the workpiece 54, the cylindrical axis of the roller 68 is rotated from the transverse direction of the workpiece 54 by an angle A (whose magnitude is exaggerated for purposes of illustration in FIG. 8) during propagation of the bend. In the initiation phase, FIG. 8(a), the roller 68 is parallel to the roller 58. As the bend is propagated, FIG. 8(b), the roller 68 is rotated through the angle A relative to the roller 58.

To accomplish this deformation, the workpiece 54 must slide laterally (sideways) over the surface of the bending roller 58, which could impose surface shears on the workpiece 54 that can lead to delaminations. To overcome this potential problem, where observed, a sleeve 109 is fitted over the bending roller 58. The sleeve 109 slides sideways along the axis of the bending roller 58 as the workpiece 54 passes over the bending roller, thereby avoiding introduction of excessive surface shears into the workpiece 54.

As the roller 68 is rotated through the angle A, the as-yet unbent portion of the workpiece 58 rotates slightly in its plane. To avoid warping the workpiece 78, the direction in which the force 78 is applied to the rear-edge clamp 78 is varied by passing a cable that applies the force 78 over a pulley 170. The pulley 170 simultaneously rotates and is displaced laterally in a slide 172 so that the force 78 is always applied in a direction such that the as-yet unbent portion of the workpiece 54 is not warped.

Figure 9:
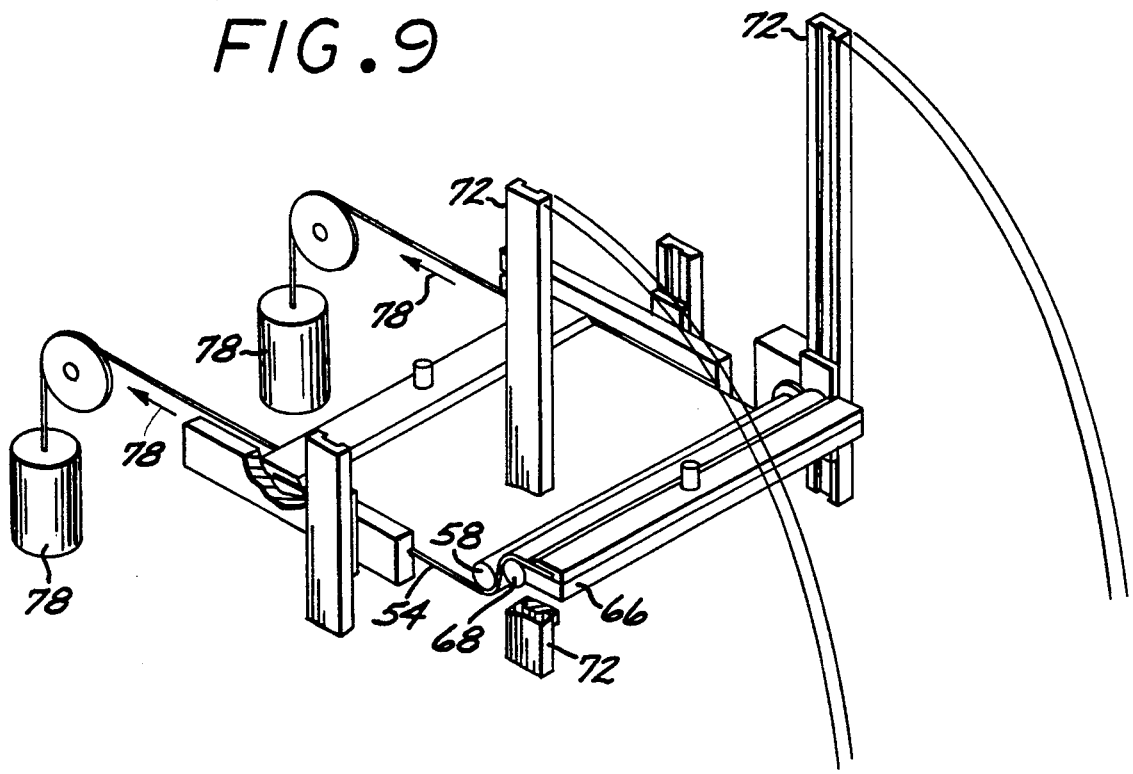
FIG. 9 is a schematic perspective view of a modified form of the apparatus of FIG. 3.

FIG. 9 depicts another embodiment of the apparatus 50, which has a structure similar to that shown in FIG. 3 except that the slides 72 are pivotable about a pivot point coincident with the axis of the roller 58. The pivoting action of the slides 72 is accomplished by a servomotor, not shown in the drawings. This pivoting permits the clamp 66 and second roller 68 to move in a direction other than at 90 degrees to the initial plane of the workpiece 54. The ability to move at other angular directions is desirable, as it permits the angle of the bend in the workpiece to be other than 90 degrees, and the radius of the bend in the workpiece to be greater than the radius of the bending roller 58. That is, by adjusting the angle of the slides 72 during the bending operation, a range of constant or varying radii of curvature can be formed in the bends introduced by drawing the workpiece 54 over the bending roller 58. FIG. 9 also illustrates some other variations of the structure of the apparatus 50, wherein no vacuum bag is used.

Figure 10:
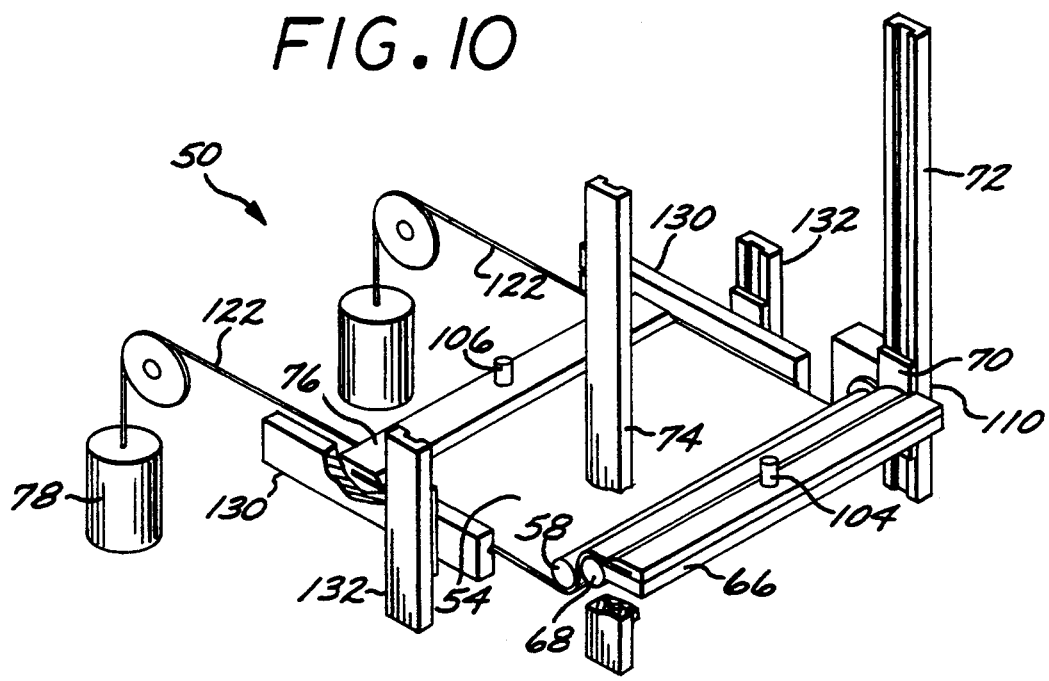
FIG. 10 is a schematic perspective view of another modified form of the apparatus of FIG. 3.

A further modification of the apparatus of FIG. 3 is illustrated in FIG. 10. In this approach, the trailing edge clamp 76 is mounted in a block 190. The block 190 is mounted in a slide 132 so that it may be displaced vertically. With this modification, both the leading edge clamp 66 and the trailing edge clamp 76 may be displaced vertically during the deformation operation. This displacement precisely controls the direction of the application of force to the trailing edge clamp 76 through the cables 122. To form bends with radii of curvature larger than the radius of a cylindrical bending roller, the force vector applied by the cables 122 must be displaced from the horizontal to prevent compression in the workpiece 54.

Figure 11:
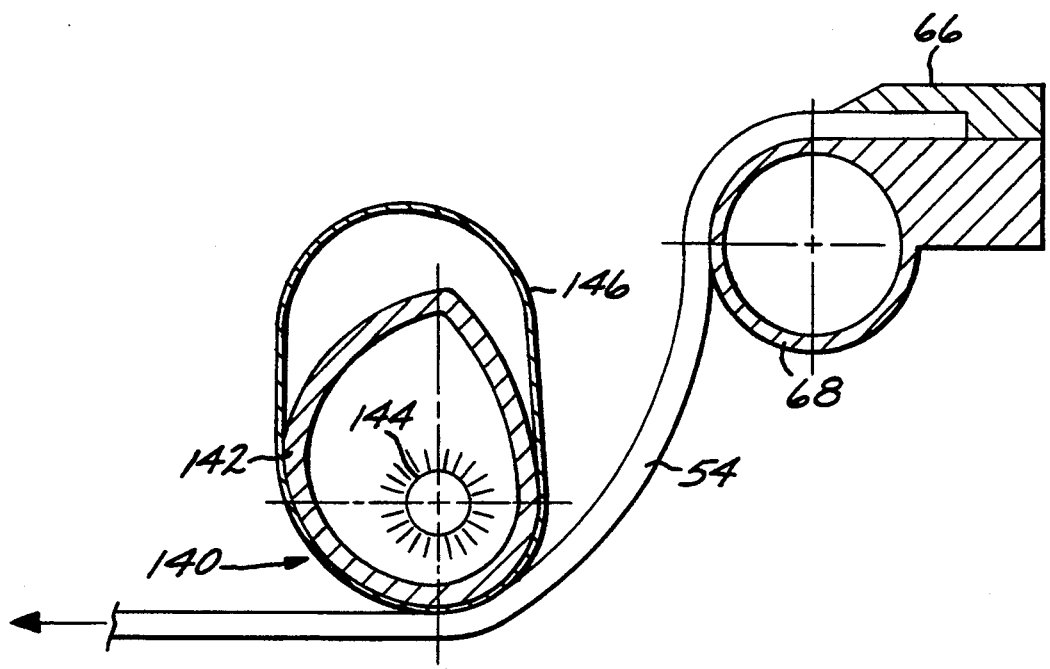
FIG. 11 is a schematic end view of a bending roller suitable for introducing constant or variable large radii of curvature into a workpiece.
Figure 12:
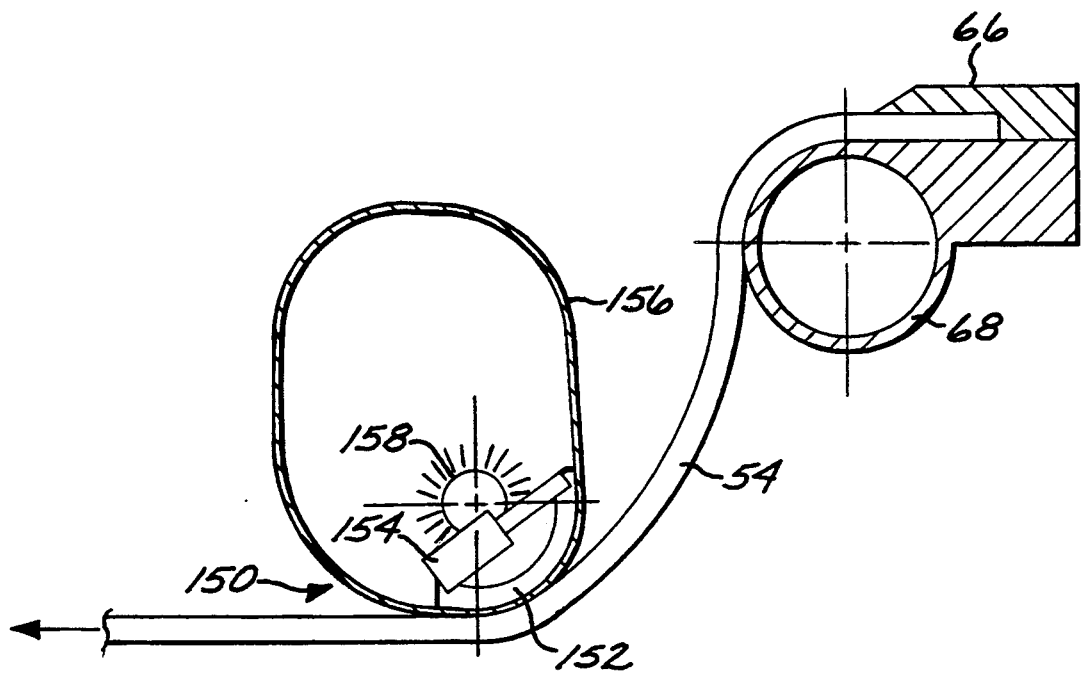
FIG. 12 is a schematic end view of another version of a bending roller suitable for introducing constant or variable large radii of curvature into a workpiece.

Variable or large radii can be introduced into the workpiece 54 using irregularly shaped variants of the bending roller 58, as illustrated schematically in FIGS. 11 and 12. These variants permit a constant or controllably variable large radius of curvature to be introduced into the workpiece 54.

In FIG. 11, a bending roller 140 has a hollow, cam-shaped shaping element 142 heated internally by a heater 144, as discussed previously. Overlying the shaping element 142 is a flexible outer sheath 146, made of a metal or a high temperature plastic such as a polyimide, that slides over the surface of the shaping element 142 as the workpiece 54 is drawn over the surface of the bending roller 140 by the movement of the clamp 66 and second roller 68. In one method of using this structure, the shaping element 142 is held stationary, and the bend Introduced into the workpiece 54 has the shape defined by the stationary portion of the circumference of the shaping element 142 that is adjacent to the workpiece 54 along its entire length as it is drawn over the bending roller 140. In another method of using this structure, the shaping element 142 is controllably rotated about its central axis as the workpiece 54 is drawn over the bending roller 140, so that the local curvature of the workpiece 54 is that determined by the curvature of the shaping element 142 that is adjacent to the workpiece 54 at a particular moment and location.

FIG. 12 illustrates another version of the structure of FIG. 11, which has even greater generality in introducing constant or variable large radii of curvature into the workpiece 54. A bending roller 150 has a flexible shaping element 152, such as an articulated array of fixed pieces, whose shape can be varied by a controllable actuator 154. A flexible outer sheath 156 slides over the shaping element 152. A heater 158 is placed inside the outer sheath 156 so that it may heat the side of the shaping element 152 that does not press against the workpiece 54. As the workpiece is drawn past the bending roller 150, the shape of the shaping element 152 may be held constant to produce a constant curvature in the workpiece 54, or may be changed by movement of the actuator 154 to produce a variable curvature in the workpiece 54.

It is understood that the various modifications depicted in the versions of the apparatus 50 of FIGS. 3, 9, 10, 11, and 12 may be used in various combinations as needed.

The present approach represents an important advance in the art of forming of composite material workpieces. The apparatus and process of the invention permit die-less forming and have its advantages. However, the apparatus is simpler and easier to operate than the apparatus of the prior techniques for die-less forming. Transverse forming is more continuous and faster than previously possible. The present approach also produces a better-quality final product than possible with the prior approaches. Although particular embodiments of the invention have been described in detail for purposes of illustration, various modifications may be made without departing from the spirit and scope of the invention. Accordingly, the invention is not to be limited except as by the appended claims.

What is claimed is:

1. A process for continuously forming a transverse bend in a workpiece of a fiber-containing composite material, comprising the steps of:
   supplying the workpiece of the fiber-containing composite material having fibers embedded within a matrix, the workpiece having a longitudinal direction and a transverse direction defined therefor;
   passing the workpiece in the transverse direction through apparatus having a bending roller extending in the longitudinal direction over substantially an entire length of the workpiece and defining a forming zone adjacent to the bending roller, the bending roller permanently bending the composite workpiece by
   introducing a net bending deformation into the workpiece,
   placing the workpiece into a vacuum forming bag, and
   progressively propagating the introduced net bending deformation transversely through the workpiece as the workpiece is moved in the transverse direction, the propagating being accomplished such that the transverse laminar length of the workpiece remains substantially unchanged during the forming process, the workpiece remaining in the vacuum forming bag during the step of progressively propagating; and
   applying a tension loading across the entire workpiece in the transverse direction to the forming zone, from outside of the forming zone.

2. The process of claim 1, wherein the net bending deformation is introduced at an edge of the workpiece.

3. The process of claim 1, including the additional step of
   heating the workpiece in the region contacted by the bending roller.

4. The process of claim 1, including the additional step of
   cooling the workpiece in at least some of the regions remote from the bending roller.

5. The process of claim 1, including the additional step, prior to the step of introducing a net bending deformation, of
   placing flexible membranes on either side of the workpiece, the workpiece remaining between the flexible membranes during the step of progressively propagating.

6. The process of claim 1, wherein the vacuum forming bag comprises
   a flexible top sheet and a flexible bottom sheet joined together along their longitudinal edges,
   a set of side strips at each longitudinal edge of the workpiece and between the top sheet and the bottom sheet,
   a leading edge caul plate joining the top sheet and the bottom sheet along a leading transverse edge that first enters the apparatus, and
   a trailing edge caul plate joining the top sheet and the bottom sheet along a trailing transverse edge remote from the leading transverse edge.

7. The process of claim 1, wherein the bending roller is cylindrical.

8. The process of claim 1, wherein the bending roller has a variable curvature.

9. The process of claim 1, wherein the step of passing includes the step of:
   placing a sleeve over the bending roller.

10. A process for continuously forming a workpiece of a reinforced composite material, comprising the steps of:
    supplying the workpiece of the reinforced composite material having reinforcements embedded within a matrix, the workpiece being formable at a forming temperature;
    heating the portion of the workpiece in the forming zone to at least the forming temperature;
    applying a tension loading in a loading direction to the forming zone of the workpiece through an entire thickness of the workpiece, the tension loading being applied to the workpiece outside of the forming zone;
    placing the workpiece into a vacuum forming bag; and
    bending the portion of the workpiece in the forming zone over a bending roller having an axis lying perpendicular to the loading direction in a kinematically admissible manner such that the laminar length of the workpiece, in the direction of loading, remains substantially unchanged during the bending process, the workpiece remaining in the vacuum forming bag during the step of bending.

11. The process of claim 10, including the additional step of cooling the workpiece in at least some of the regions outside of the forming zone.

12. The process of claim 10, including the additional step, prior to the step of bending, of placing flexible membranes on either side of the workpiece, the workpiece remaining between the flexible membranes during the step of bending.

13. The process of claim 10, wherein the vacuum forming bag comprises a flexible top sheet and a flexible bottom sheet joined together along their longitudinal edges, a set of side strips at each longitudinal edge of the workpiece and between the top sheet and the bottom sheet, a leading edge caul plate joining the top sheet and the bottom sheet along a leading transverse edge that first enters the apparatus, and a trailing edge caul plate joining the top sheet and the bottom sheet along a trailing transverse edge remote from the leading transverse edge.

14. The process of claim 10, including the additional step, after the step of bending, of propagating the workpiece through the forming zone.

* * * * *